(12) United States Patent
Singer et al.

(10) Patent No.: US 11,847,461 B2
(45) Date of Patent: Dec. 19, 2023

(54) OUT-OF-ORDER INPUT / OUTPUT WRITE

(71) Applicant: MELLANOX TECHNOLOGIES, LTD., Yokneam (IL)

(72) Inventors: Alon Singer, Tel Aviv (IL); Zachy Haramaty, Hemed (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/748,066

(22) Filed: May 19, 2022

(65) Prior Publication Data
US 2023/0376314 A1 Nov. 23, 2023

(51) Int. Cl.
*G06F 9/38* (2018.01)
*G06F 9/30* (2018.01)
*G06F 13/16* (2006.01)

(52) U.S. Cl.
CPC ........ *G06F 9/3836* (2013.01); *G06F 9/30101* (2013.01); *G06F 9/30145* (2013.01); *G06F 9/30189* (2013.01); *G06F 13/16* (2013.01)

(58) Field of Classification Search
None
See application file for complete search history.

(56) References Cited

U.S. PATENT DOCUMENTS

| | | | |
|---|---|---|---|
| 5,778,434 A | 7/1998 | Nguyen et al. | |
| 7,694,079 B2 | 4/2010 | Abouelwafa | |
| 7,698,453 B2 * | 4/2010 | Samuels | H04L 67/2876 709/224 |
| 7,836,328 B1 | 11/2010 | Puri et al. | |
| 8,244,950 B2 | 8/2012 | Barth et al. | |
| 8,874,680 B1 * | 10/2014 | Das | H04L 67/568 711/119 |
| 11,500,641 B2 * | 11/2022 | Abdelhafez | G06F 8/445 |
| 11,704,038 B2 * | 7/2023 | Mujoo | G06F 3/0641 711/154 |
| 2004/0019713 A1 | 1/2004 | Bissessur et al. | |
| 2005/0172055 A1 | 8/2005 | Ho et al. | |
| 2006/0020606 A1 | 1/2006 | Harris et al. | |

(Continued)

OTHER PUBLICATIONS

'The RISC-V Instruction Set Manual vol. I: Unprivileged ISA' Document Version Jun. 8, 2019-Base-Ratified, Andrew Waterman et al., Jun. 8, 2019. (Year: 2019).*

(Continued)

*Primary Examiner* — Steven G Snyder
(74) *Attorney, Agent, or Firm* — KLIGLER & ASSOCIATES PATENT ATTORNEYS LTD

(57) ABSTRACT

A System-On-Chip (SoC) includes a set of registers, a processor, and Out-Of-Order Write (OOOW) circuitry. The processor is to execute instructions including write instructions. After issuing a first write instruction to any of the registers in the set, the processor is to await an acknowledgement for the first write instruction before issuing a second write instruction to any of the registers in the set. The OOOW circuitry is to identify the write instructions issued by the processor to the registers in the set, to perform the identified write instructions in the registers irrespective of acknowledgements from the registers, and to send to the processor imitated acknowledgements for the identified write instructions.

16 Claims, 2 Drawing Sheets

(56) References Cited

U.S. PATENT DOCUMENTS

| | | | |
|---|---|---|---|
| 2006/0288195 A1* | 12/2006 | Ma | G06F 9/3885 712/E9.05 |
| 2007/0273699 A1* | 11/2007 | Sasaki | G06F 9/3879 345/502 |
| 2013/0036152 A1* | 2/2013 | Goyal | G06F 11/203 709/201 |
| 2016/0070648 A1* | 3/2016 | Wu | G06F 12/0866 711/118 |
| 2017/0083326 A1* | 3/2017 | Burger | G06F 12/0862 |
| 2017/0083329 A1* | 3/2017 | Burger | G06F 9/3853 |
| 2019/0266091 A1* | 8/2019 | Robinson | G06F 12/10 |
| 2019/0266092 A1* | 8/2019 | Robinson | G06F 12/0831 |
| 2019/0266101 A1* | 8/2019 | Robinson | G06F 12/1063 |
| 2020/0371917 A1* | 11/2020 | Chachad | G06F 12/0811 |
| 2021/0279064 A1* | 9/2021 | Deglin | G06F 9/3836 |
| 2022/0107811 A1* | 4/2022 | Abdelhafez | G06F 9/3836 |
| 2022/0326866 A1* | 10/2022 | Mujoo | G06F 16/1805 |
| 2023/0315319 A1* | 10/2023 | Mujoo | G06F 3/0652 711/154 |

OTHER PUBLICATIONS

Adve et al., "Shared Memory Consistency Models: A Tutorial," IEEE, Computer, vol. 29, issue 12, pp. 66-76, Dec. 1996.

Maranget et. al., "A Tutorial Introduction to the ARM and POWER Relaxed Memory Models," Revision 120, University of Cambridge, pp. 1-50, Oct. 10, 2012.

Waterman et al., "The RISC-V Instruction Set Manual, vol. II: Privileged Architecture," version 1.9.1, pp. 1-87, Nov. 4, 2016.

Waterman et al., "The RISC-V Instruction Set Manual, vol. II: Privileged Architecture," version 1.9.1, chapter 3.5.4, pp. 41-42, Nov. 4, 2016.

Haramaty et al., U.S. Appl. No. 17/367,367, filed Jul. 4, 2021.

U.S. Appl. No. 17/367,367 Office Action dated Oct. 27, 2022.

* cited by examiner

OUT-OF-ORDER INPUT / OUTPUT WRITE

FIELD OF THE INVENTION

The present invention relates general to computer systems, and particularly to methods and systems for out-of-order I/O write cycles in computer systems.

BACKGROUND OF THE INVENTION

Various computer systems may allow or prohibit Out-of-Order memory and/or I/O write cycles. In "A Tutorial Introduction to the ARM and POWER Relaxed Memory Models", Maranget et. al., University of Cambridge, Oct. 10, 2012, Revision 120, the authors describe how ARM and IBM POWER multiprocessors have highly relaxed memory models, making use of a range of hardware optimizations that do not affect the observable behavior of sequential code but which are exposed to concurrent programmers, and in which concurrent code may not execute in the way one intends unless sufficient synchronization, in the form of barriers, dependencies, and load-reserve/store-conditional pairs, is present.

In The RISC-V Instruction Set Manual, Volume II: Privileged Architecture, version 1.9.1, Nov. 4, 2016, chapter 3.5.4, the memory ordering of RISC-V is described, including strongly ordered accesses to the I/O region and weakly ordered accesses to the RAM.

Lastly, in "Shared Memory Consistency Models: a Tutorial", Adve and Gharachorloo, IEEE Computer, December 1996, volume 29, issue 12, the authors assert that the memory consistency model of a system affects performance, programmability, and portability, and then describe memory consistency models, focusing on consistency models proposed for hardware-based shared memory systems.

SUMMARY OF THE INVENTION

An embodiment of the present invention that is described herein provides a System-On-Chip (SoC) including a set of registers, a processor, and Out-Of-Order Write (OOOW) circuitry. The processor is to execute instructions including write instructions. After issuing a first write instruction to any of the registers in the set, the processor is to await an acknowledgement for the first write instruction before issuing a second write instruction to any of the registers in the set. The OOOW circuitry is to identify the write instructions issued by the processor to the registers in the set, to perform the identified write instructions in the registers irrespective of acknowledgements from the registers, and to send to the processor imitated acknowledgements for the identified write instructions.

In some embodiments, the OOOW circuitry is to select an operational mode from an out-of-order mode and an in-order mode, and to operate in accordance with the selected operational mode, wherein (i) in the out-of-order mode, which the OOOW circuitry is to perform the identified write instructions irrespective of the acknowledgements from the registers, and to send the imitated acknowledgements to the processor, and (ii) in in-order mode, the OOOW circuitry is not to send the imitated acknowledgements. In a disclosed embodiment, the OOOW circuitry is to select the operational mode depending on a value in one of the registers. In an example embodiment, the processor includes at least first and second processing cores, and the OOOW circuitry is to select the operational mode independently for the first procession core and for the second processing core.

In an embodiment, the OOOW circuitry is to prevent the acknowledgements sent by the registers from reaching the processor when operating in the out-of-order mode, and to allow the acknowledgements sent by the registers to reach the processor when operating in the in-order mode.

In some embodiment, the registers in the set are Configuration-Space Registers (CSRs) of the processor. In another embodiment, the registers in the set are a defined subset of CSRs of the processor. In an embodiment, the OOOW circuitry is to prevent the acknowledgements sent by the registers from reaching the processor.

There is additionally provided, in accordance with an embodiment that is described herein, a method including, using a processor, executing instructions including write instructions to a set of registers, including, after issuing a first write instruction to any of the registers in the set, awaiting an acknowledgement for the first write instruction before issuing a second write instruction to any of the registers in the set. Using Out-Of-Order Write (OOOW) circuitry coupled to the processor, the write instructions issued by the processor to the registers in the set are identified, the identified write instructions are performed in the registers irrespective of acknowledgements from the registers, and imitated acknowledgements for the identified write instructions are sent to the processor.

There is further provided, in accordance with an embodiment that is described herein, a System-On-Chip (SoC) including a processor and Out-Of-Order Write (OOOW) circuitry. The processor is to execute write instructions to a set of registers using strict ordering, in which the processor awaits acknowledgement for a current write instruction issued to any of the registers in the set before issuing a next write instruction to any of the registers in the set. The OOOW circuitry is to identify the write instructions issued by the processor to the registers in the set, to perform the identified write instructions in the registers regardless of whether acknowledgements were sent from the registers, and to send to the processor imitated acknowledgements for the identified write instructions.

The present invention will be more fully understood from the following detailed description of the embodiments thereof, taken together with the drawings in which:

DETAILED DESCRIPTION OF EMBODIMENTS

Overview

Figure 1:
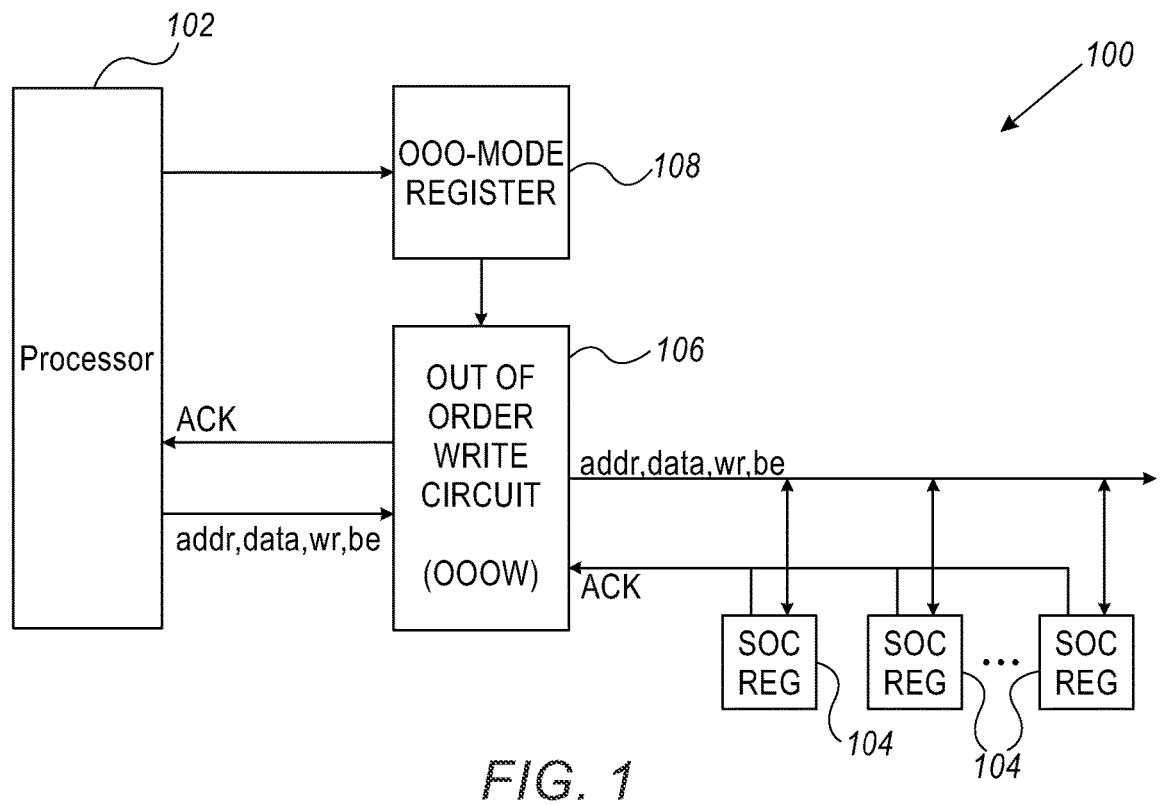
FIG. 1 is a block diagram that schematically illustrates a System on Chip (SoC) that facilitates out-of-order I/O write, in accordance with an embodiment of the present invention.

Processors in computer systems in general and Systems on Silicon (SoCs) in particular, sometimes enforce strict ordering when accessing memory and/or I/O, wherein no access is allowed until the previous access is completed.

In the description herein, we will focus on I/O writes (e.g., writes to registers) by way of example; The disclosed techniques, however, are not limited to I/O writes and may be used in other types of write cycles, including memory-write cycles. In the description hereinbelow we will refer to processors, wherein a processor is an apparatus that is configured to execute instructions, such as one or more central processing units (CPUs), Graphic Processor Units—(GPUs), and similar. Typically, although not necessarily, the processor has separate read/write busses for memory and for I/O.

The advantage of strict ordering in I/O writes is mainly loss of data integrity when the write operations are not done in order. In practice, I/O registers that the processor writes into send an Acknowledge signal (ACK), and the processor refrains from executing further I/O write operations (or, sometimes, from executing other instructions) until the processor receives the ACK.

In the description that follows we will use the terms "strict order" and "strong order" interchangeably. We will further use the terms "weak order", "loose order" and "Out-of-Order" to imply a memory order discipline that is not strong.

In large SoCs the I/O-write operation may write data to registers that are distributed in the SoC; some of the registers may be remote from the processor, and the propagation delay of the write bus and of the return ACK signal may be long (e.g., tens of clock cycles). Mandating strict order in such an SoC may degrade the performance of the processor. For example, if the SoC comprises a plurality of configuration registers that the processor sets upon initialization, the initialization may take a longer time if the processor is to wait for an ACK in each write I/O cycle, although data integrity of the written values when the write operations are not done in order may not be important.

Embodiments of the present invention that are disclosed herein provide apparatuses and methods for processor-selected strict order or out-of-order write I/O operations in SoCs. In some embodiments, the SoC comprises a processor and an Out-of-Order Write (OOOW) circuit that is configured to send an imitated ACK signal to the processor's ACK input in response to a write I/O cycle that the processor may generate; thus, the processor does not have to wait for an ACK before proceeding to the next instruction.

Throughout the present specification and claims the term "imitated acknowledgement" (or "imitated ACK"), in various grammatical forms, refers to a signal, message, or other indication that is sent to a processor in response to a write instruction to a register, but does not originate from the register being written to and does not necessarily follow successful execution of the write instruction in the register.

In an embodiment, the SoC further comprises an Out-of-Order Mode (OOO-Mode) register that indicates whether the SoC is in an OOO-Mode. When the SoC is in OOO-Mode, the OOOW circuit generates an imitated ACK responsively to a Write I/O; when the SoC is not in the OOO-Mode, the OOOW circuit sends the ACK that the registers generate to the processor. In some embodiments the OOO-Mode register is a Control and Status Register (CSR), that is embedded in the processor and accessed by a set of CSR instructions.

Thus, according to embodiments of the present invention, processors in SoCs may choose to execute write-I/O instructions at high-speed using out-of-order discipline, or using strict order discipline, trading speed for data integrity. The disclosed OOOW circuits may be coupled externally to legacy processors that do not support Out-of-Order I/O writes, thereby improving their performance without modifications to the internal processor architecture.

System Description

In the description of embodiments hereinbelow, we will refer mainly to SoCs comprising a processor that executes a software program. In embodiments, the processor may comprise a plurality of processors, including Central Processing Units (CPUs), Graphic Processor Units (GPUs), Data Processing Units (DPUs) and others.

FIG. 1 is a block diagram that schematically illustrates a System on Chip (SoC) 100 that facilitates out-of-order I/O write, in accordance with an embodiment of the present invention. SoC 100 comprises a Processor 102, which is configured to write data to a plurality of SoC registers 104. SoC Registers 104 typically store SoC configuration data and may be distributed in various subunits of the SoC, which may be remote from processor 102; hence the latency time for accessing SoC registers 104 may be relatively long (e.g., tens of clock cycles). Each SoC register 104 acknowledges a write operation by asserting an ACK signal. (The ACK signals of SoC registers 104 are ORed to generate a combined ACK signal; the wired-OR configuration illustrated in FIG. 1 is symbolic—in some embodiments actual OR gates (or De-Morgan equivalents thereof) are used; in embodiments daisy chain, tree or any other suitable OR structures may be used.)

Processor 102 is configured to write data into registers 104 obeying strong memory ordering discipline, in which the written SoC register acknowledges the write operation by sending an ACK signal, and the processor does not issue further I/O write cycles until the ACK signal is received. Strong memory ordering may be beneficial to prevent cases where, due to different delays in the SoC, write order may be otherwise reversed. However, in other cases, write order does not matter, and system performance may be degraded if strong write ordering is applied when writing to all SoC registers. For example, when the processor writes a long list of configuration parameters to the SoC configuration registers upon startup, fast execution is important, whereas the order may be irrelevant.

According to the example embodiment illustrated in FIG. 1, processor 102 further comprises an Out-of-Order Write circuit (OOOW) 106, which is configured to enable out-of-order writes to SoC registers 104 responsively to an Out-of-Order (OOO) Mode indication, and an Out-of-Order Mode (OOO-Mode) register 108, to indicate when OOO Mode is active.

To activate OOO-Mode, processor 102 writes an OOO Mode indication (e.g., logic-high) in OOO-Mode register 108. In some embodiment, OOO-Mode register 108 is embedded in processor 102; in an embodiment, OOO-Mode register 108 is a Control and Status Register (CSR) that the processor can access using CSR access instructions.

When OOOW circuit 106 receives an OOO-mode indication, the OOOW circuit detects when processor 102 writes to SoC registers 104 and, responsively, sends an imitated ACK signal to the processor's ACK input, ignoring any ACK signal that SoC registers 104 may generate. When OOO-Mode register 108 does not indicate OOO mode, OOOW circuit 106 transfers the ACK signals that SoC registers 104 generate to the processor, which will now execute strong-ordered writes to the SoC registers.

Thus, according to the example embodiment illustrated in FIG. 1 and described hereinabove, when OOO mode is set, processor 102 can write a sequence of values to SoC registers 104 without waiting for the SoC registers to send ACK signals, saving the latency time within the SoC. When OOO mode is not set, the processor writes to the SoC registers in a strong-order mode, assuring data integrity. Processor 102 can select the OOO mode by writing into OOO Mode register 108.

The configuration of SoC 100 illustrated in FIG. 1 and described above is an example that is cited for the sake of conceptual clarity. Other configurations may be used in alternative embodiments. For example, in some embodiments, OOOW circuit 106 may be configured to allow out-of-order writes to a predefined subset of SoC registers 104; in other embodiments, multiple OOO-Mode registers (or multiple bits of a single OOO-Mode registers) may define OOO mode for predefined subsets of SoC registers 104.

In some embodiments, some or all SoC registers 104 do not output an ACK signal (or output an ACK signal that is ignored), and the OOOW circuit is configured to issue an imitated ACK that is delayed by a short time interval when OOO-mode is on, and by a long time interval when OOO-Mode is off (the long time interval may be configured to assure strong write ordering).

Figure 2:
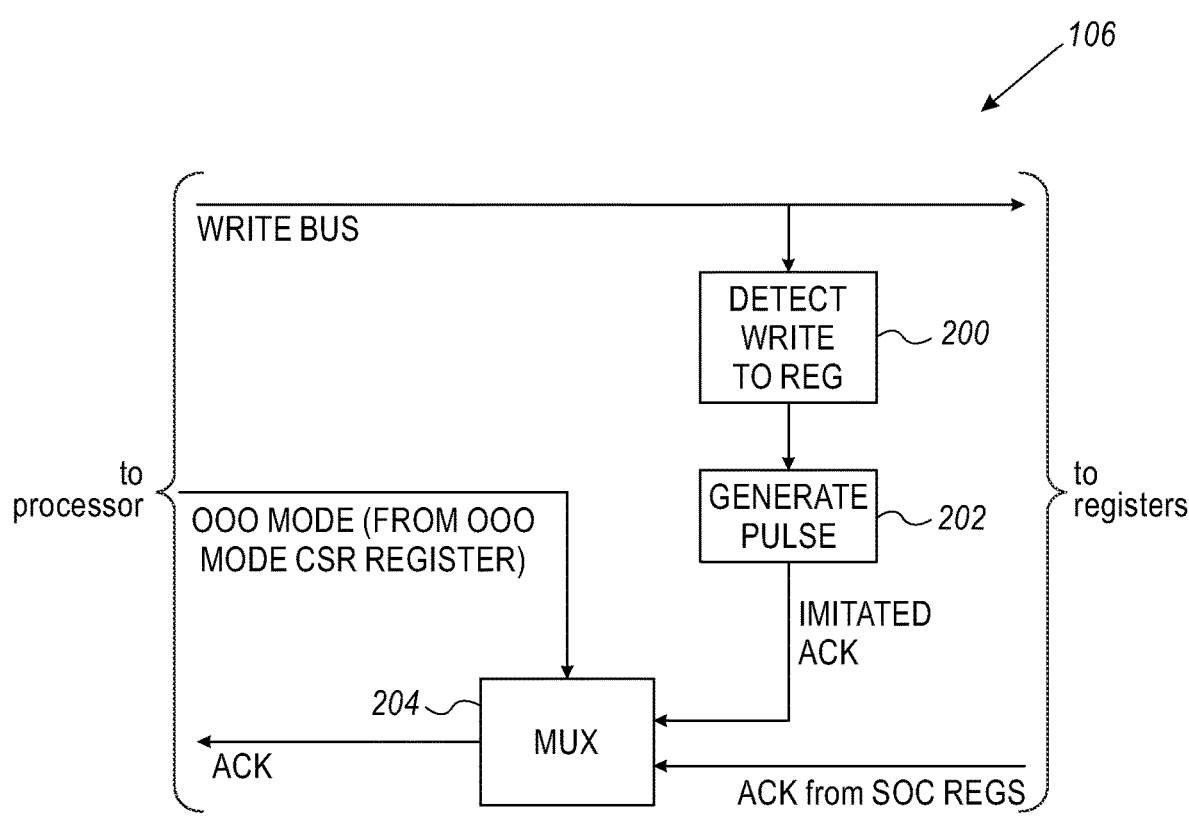
FIG. 2 is a block diagram that schematically illustrates the structure of an Out-of-Order Write (OOOW) circuit in the SoC of FIG. 1, in accordance with an embodiment of the present invention.

FIG. 2 is a block diagram that schematically illustrates the structure of OOOW circuit 106 (FIG. 1), in accordance with an embodiment of the present invention. The OOOW circuit is connected between the processor and the SoC registers (e.g., between processor 102 and SoC registers 104, FIG. 1), and comprises a Write-Detect circuit 200, a Pulse Generator 202 and a Multiplexer 204.

Write-Detect circuit 200 monitors the Write bus that the processor outputs and detects writes into the SoC registers. In some embodiments, the write bus comprises a write signal that indicates a write, and the Detect-Write circuit is not needed. In other embodiments, the Detect-Write circuit indicates write to SoC registers by detecting a logic condition on the write bus; the condition may be, in an embodiment, the combination of a Write signal, an Enable signal, and an I/O signal; in another embodiment the condition may include some of the address bits.

Pulse-Generator circuit 202 generates, responsively to write-register detection, an imitated-ack signal. To comply with the ACK characteristics that the processor expects, in some embodiments, the pulse may have a preset width; in an embodiment, the Pulse-Generator generates the pulse a preset time after receiving the write-register indication.

Multiplexer 204 is controlled by OOO-Mode register 108 (FIG. 1) (according to the example embodiment illustrated in FIG. 2, OOO-Mode register 108 is a CSR register that is embedded in processor 102; in other embodiments the OOO-Mode register may be external to the processor). The multiplexer 204 sends a selected input to the ACK input of the processor. When OOO-Mode is active, the multiplexer selects the imitated ACK, and when OOO-Mode is not active the multiplexer selects the ACK signal that SoC registers 104 send. When OOO-Mode is active, multiplexer 204 also prevents the ACK signals sent by the SoC registers from reaching the processor.

The configuration of OOOW circuit 106 illustrated in FIG. 2 and described above is cited by way of example. Other configurations may be used in alternative embodiments, for example, in some embodiments, to save power, Pulse Generator 202 does not generate pulses when OOO-Mode is not active.

Figure 3:
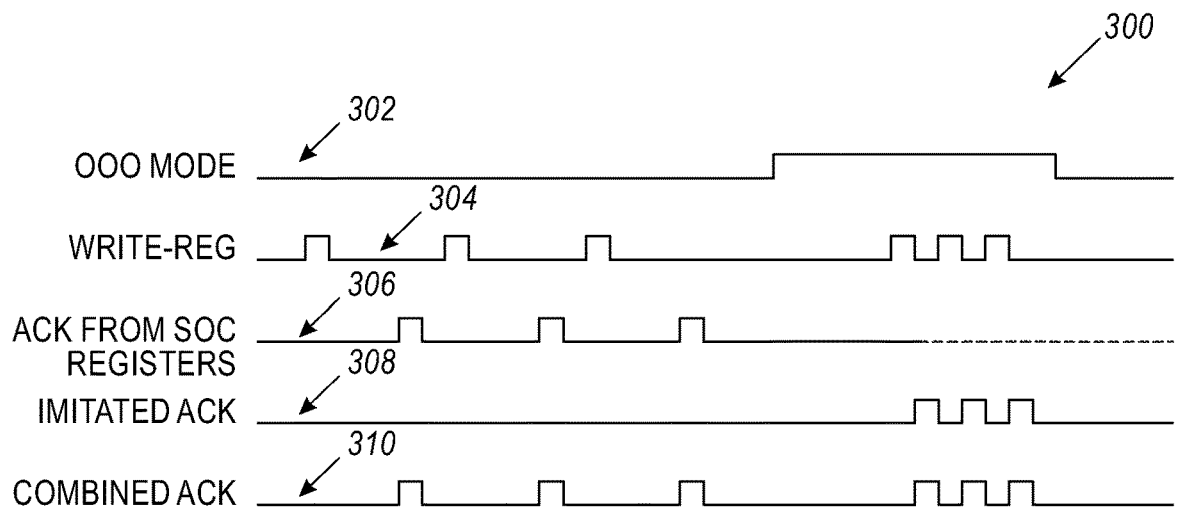
FIG. 3 is a graph that schematically illustrates waveforms associated with writing to SoC registers, in accordance with an embodiment of the present invention.

FIG. 3 is a graph 300 that schematically illustrates the waveforms associated with writing to SoC registers, in accordance with an embodiment of the present invention. An OOO-Mode waveform 302 illustrates the OOO-Mode activation; a Write-Reg waveform 304 illustrates write pulses to the SoC registers; an ACK-From-Registers waveform 306 illustrates the ACK signal that the SoC registers output; an Imitated-ACK waveform 308 illustrates the ACK signal that Pulse-Generator 202 (FIG. 2) generates; and a Combined-ACK waveform 310 illustrates the combined-ACK signal that OOOW circuit 106 (FIG. 1) sends to the processor.

As can be seen, the delay between write-reg pulses and the corresponding ACK signals from the SoC registers is relatively long, and, hence, when OOO Mode is not active, the combined ACK that the processor receives lags considerably after the corresponding write pulses and, consequently, the processor, which must wait for ACK signals between writes, generates a sparse sequence of write pulses.

When OOO-Mode is active, the imitated ACK signal follows the write pulse closely, the combined ACK is pulsed shortly after the corresponding write-reg, and the processor may send the write pulses in quick succession.

The graph illustrated in FIG. 3 and described hereinabove is cited by way of example. Other graphs may be used in alternative embodiments. For example, in some embodiments, imitated acknowledge is generated irrespectively to the OOO-Mode (but not selected by multiplexer 204 (FIG. 2) when OOO-Mode is not active).

Figure 4:
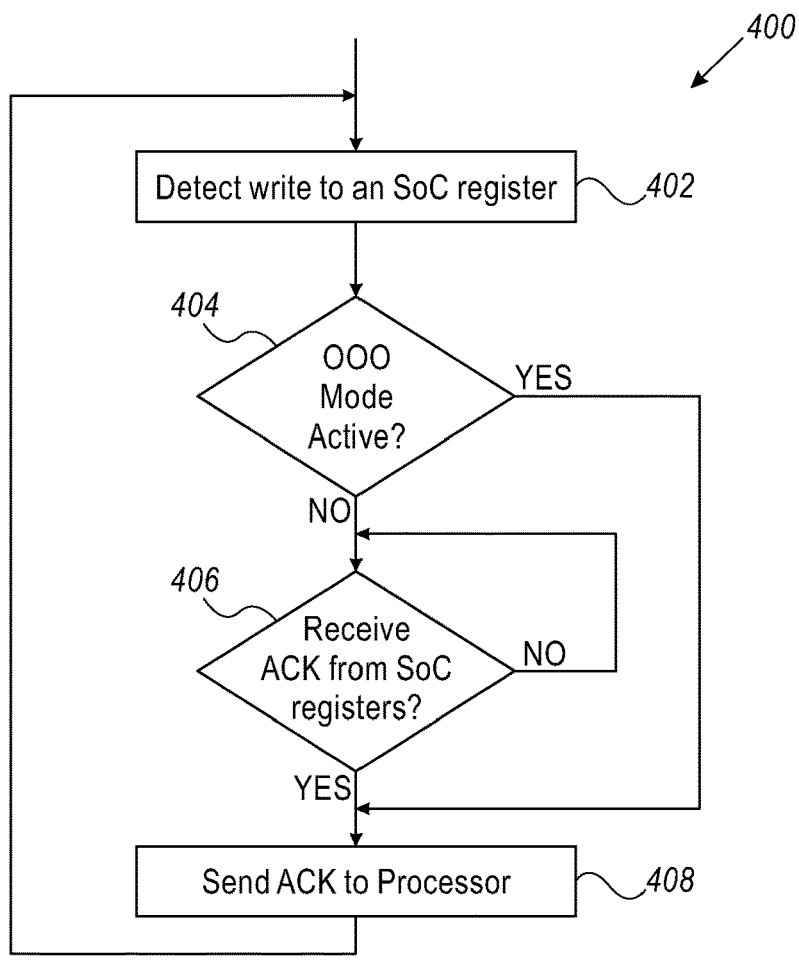
FIG. 4 is a flowchart that schematically illustrates a method for writing into registers that supports OOO Mode, in accordance with an embodiment of the present invention.

FIG. 4 is a flowchart 400 that schematically illustrates a method for writing into registers that supports OOO Mode, in accordance with an embodiment of the present invention. The flowchart is executed by OOOW circuit 106 (FIG. 1).

The flowchart starts at a Detect-Write operation 402, wherein the OOOW circuit waits for the processor to issue a Write to one of the SoC registers. Next, in a Check OOO-Mode operation 404, the OOOW circuit checks if OOO-Mode is active. If not so, the OOOW circuit enters a Wait-Registers-ACK operation 406 and waits until receiving an ACK from the SoC register (that was accessed in the write cycle detected in operation 402).

When, in operation 406, the OOOW circuit receives an ACK from the SoC registers, the OOOW circuit enters a Send-ACK operation 408, sends an ACK to the processor and then reenters operation 402 to wait for the next time that the processor writes to an SoC register.

If, in operation 404, OOO mode is active, the OOOW circuit will enter operation 408, to send an ACK signal (in this case an imitated ACK signal) without waiting for an ACK from the SoC registers.

Thus, according to the flowchart illustrated in FIG. 4 and described hereinabove, a processor can execute strong order or weak order (OOO) writes to a set of SC registers, according to an OOO-Mode that the processor can set.

The configurations of SoC 100, Out-of-Order Write Circuit 106, Processor 102, OOO-Mode register 108 and SoC registers 104; the waveforms of graph 300 and the method of flowchart 400, illustrated in FIGS. 1 through 4 and described hereinabove, are example configurations, waveforms and flowcharts that are shown purely for the sake of conceptual clarity. Any other suitable configurations, waveforms and flowcharts can be used in alternative embodiments. The different sub-units of SoC 100 may be implemented using suitable hardware, such as in one or more Application-Specific Integrated Circuits (ASICs) or Field-Programmable Gate Arrays (FPGAs), using software, using hardware, or using a combination of hardware and software elements.

Processor 102 (FIG. 1) may comprise one or more general-purpose processors, which are programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

It will thus be appreciated that the embodiments described above are cited by way of example, and that the present invention not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A System-On-Chip (SoC), comprising:
    a set of registers;
    a processor, to execute instructions, including executing write instructions in a specified order in which, after issuing a first write instruction to any of the registers in the set, the processor is to await an acknowledgement for the first write instruction before issuing a second write instruction to any of the registers in the set; and
    Out-Of-Order Write (OOOW) circuitry, to identify the write instructions issued by the processor to the registers in the set, to perform the identified write instructions in the registers irrespective of the specified order and irrespective of acknowledgements from the registers, and to falsely indicate to the processor that the identified write instructions are executed in the specified order by sending to the processor imitated acknowledgements for the identified write instructions.

2. The SoC according to claim 1, wherein the OOOW circuitry is to select an operational mode from:
    an out-of-order mode, in which the OOOW circuitry is to perform the identified write instructions irrespective of the specified order and irrespective of the acknowledgements from the registers, and to send the imitated acknowledgements to the processor; and
    an in-order mode, in which the OOOW circuitry is not to send the imitated acknowledgements,
    and to operate in accordance with the selected operational mode.

3. The SoC according to claim 2, wherein the OOOW circuitry is to select the operational mode depending on a value in one of the registers.

4. The SoC according to claim 2, wherein the processor comprises at least first and second processing cores, and wherein the OOOW circuitry is to select the operational mode independently for the first processing core and for the second processing core.

5. The SoC according to claim 2, wherein the OOOW circuitry is to:
    when operating in the out-of-order mode, prevent the acknowledgements sent by the registers from reaching the processor; and
    when operating in the in-order mode, allow the acknowledgements sent by the registers to reach the processor.

6. The SoC according to claim 1, wherein the registers in the set are Configuration-Space Registers (CSRs) of the processor.

7. The SoC according to claim 1, wherein the registers in the set are a defined subset of Configuration-Space Registers (CSRs) of the processor.

8. The SoC according to claim 1, wherein the OOOW circuitry is to prevent the acknowledgements sent by the registers from reaching the processor.

9. A method, comprising:
    using a processor, executing instructions including executing write instructions to a set of registers in a specified order in which, after issuing a first write instruction to any of the registers in the set, the processor is to awaiting an acknowledgement for the first write instruction before issuing a second write instruction to any of the registers in the set; and
    using Out-Of-Order Write (OOOW) circuitry coupled to the processor, identifying the write instructions issued by the processor to the registers in the set, performing the identified write instructions in the registers irrespective of the specified order and irrespective of acknowledgements from the registers, and falsely indicating to the processor that the identified write instructions are executed in the specified order by sending to the processor imitated acknowledgements for the identified write instructions.

10. The method according to claim 9, further comprising selecting an operational mode from:
    an out-of-order mode, in which the OOOW circuitry performs the identified write instructions irrespective of the specified order and irrespective of the acknowledgements from the registers, and sends the imitated acknowledgements to the processor; and
    an in-order mode, in which the OOOW circuitry does not send the imitated acknowledgements, and operating in accordance with the selected operational mode.

11. The method according to claim 10, wherein selecting the operational mode is performed depending on a value in one of the registers.

12. The method according to claim 10, wherein the processor comprises at least first and second processing cores, and wherein selecting the operational mode is performed independently for the first processing core and for the second processing core.

13. The method according to claim 10, wherein and comprising:
    when operating in the out-of-order mode, preventing the acknowledgements sent by the registers from reaching the processor; and
    when operating in the in-order mode, allowing the acknowledgements sent by the registers to reach the processor.

14. The method according to claim 9, wherein the registers in the set are Configuration-Space Registers (CSRs) of the processor.

15. The method according to claim 9, wherein the registers in the set are a defined subset of Configuration-Space Registers (CSRs) of the processor.

16. The method according to claim 9, and comprising preventing the acknowledgements sent by the registers from reaching the processor.

* * * * *